May 22, 1956 L. F. WICKMAN 2,746,712
PLUG VALVE
Filed Jan. 16, 1953
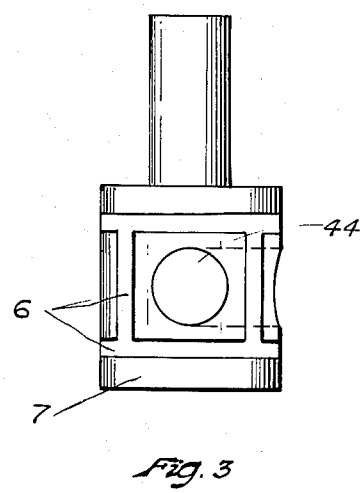
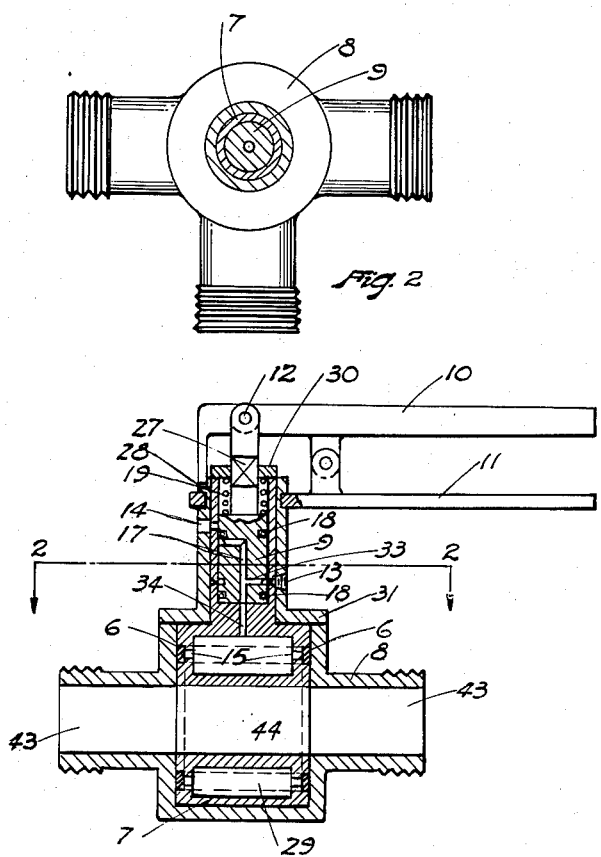
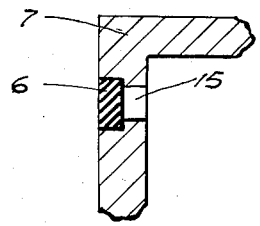
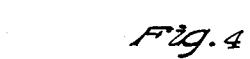
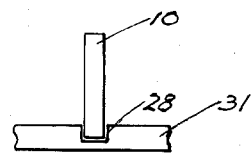
Lester Frederick Wickman
INVENTOR.
BY United States Patent Office 2,746,712
Patented May 22, 1956

2,746,712

PLUG VALVE

Lester Frederick Wickman, Oakland, Calif.

Application January 16, 1953, Serial No. 331,534

1 Claim. (Cl. 251—109)

This invention relates to improvements in plug valve construction, whereby, the rotatable valve plug and valve body contact faces are cylindrical and resilient sealing strips are set into one of its cylindrical contact faces and are flush therewith; said resilient sealing strips continuously surround the flow ports of said valve body or said valve plug; and methods of controlling the amount of sealing thereof by proper control of the pressure media used to expand the said resilient sealing strips.

I have in mind particularly valves of the sanitary three way and straightway type as used in the process lines of the milk and food processing industries. However, the method of sealing can be applied to plug valves of the general type such as are used for vacuum, air, gas or liquid services.

The primary object of the invention is to provide means of sealing around the ports of a valve plug and its body without the necessity of using a tapered or conical plug; lubrication grooves for sealing around ports, or special seals such as stuffing boxes.

An important object of the invention is to provide a means of sealing, whereby, continuous resilient strips surround the ports of the valve plug and valve body. These resilient strips such as rubber are molded, vulcanized or cemented in to form a homogeneous part of the said valve plug or said valve body.

A further object of the invention is to provide a means of expanding the said resilient sealing strips which provides the seal between and around said valve body and said valve plug port areas.

And further to provide means whereby the said pressure within the valve plug interior or valve body cavity, and exerted against the back side of the said resilient sealing strips can be released when turning valve plug to either straightway or bypass position, and again admitted after valve plug has been definitely reset in new position.

With the foregoing and other objects in view which will appear as the description proceeds, the invention consists of certain novel details of construction and combination of parts, hereinafter more fully described and pointed out in the claim, it being understood that changes may be made in the construction and arrangement of parts without departing from the spirit of the invention as claimed.

Referring to the drawing:

Figure 1 is a sectional elevation of the plug valve assembly illustrating the continuous resilient sealing strips in the rotatable cylindrical valve plug between and around its ports, constructed in accordance with the invention using air admitted into the interior of said valve plug thereby expanding the resilient sealng strips and means for releasing the air pressure thereof.

Figure 2 is a sectional plan of the 3 way plug valve taken on line 2—2 of Figure 1.

Figure 3 is an exterior view of the rotatable cylindrical valve plug indicating the resilient sealing strips circumferentially set in around the top and bottom and between the ports.

Figure 4 is an enlarged fragmental sectional view of the resilient sealing strips in the valve plug.

Figure 5 is a fragmental view of a possible method of indexing the correct position of the valve plug.

Referring to the drawings, Figure 1 in detail: The reference character 8 indicates the valve body of the plug valve. The reference character 7 indicates the rotatable cylindrical valve plug of the plug valve. The reference character 6 indicates the resilient sealing strips which surround the ported areas 43 of the valve body 8, and 44 of the rotatable cylindrical valve plug 7. Reference character 9 indicates the control valve which controls the admission or release thereof of the air pressure to the inside of the rotatable valve plug 7 cavity. Air is admitted into control valve 9 thru connection 13 and is channeled to the inside of cavity 29 of valve plug 7 thru channels 33, 17 and 34. Pressure is then exerted to back side of resilient sealing strips 6 thru openings 15. When pressure is to be released, air is rejected by squeezing levers 10 and 11 together which in turn lift control valve 9, thru pin 12, and against spring 19. Lever 10 is now released from detent 28. Channel 17 is now open to atmosphere thru opening 14 releasing said pressure. Conventional O rings 18 in control valve 9 seal the air from escaping prematurely around outside of control valve 9. Valve plug 7 is now ready to revolve to either bypass or straightway position.

Reference character 27 indicates a square on control valve 9 extension permitting the control valve 9 to raise or lower thru square hole in cap 30 which is fastened to valve plug 7 and at the same time permitting the revolvement of valve plug 7. Reference character 31 indicates a retaining hub and supporting member for lever 11 and at the same time secures the valve plug 7 within the valve body 8.

Figure 2 indicates a sectional view of the 3 way plug valve assembly taken thru lines 2—2 of Figure 1.

Figure 3 indicates an exterior view of the cylindrical rotatable valve plug 7 assembly showing the resilient sealing strips in place as well as the port openings.

Figure 4 indicates an enlarged fragmental sectional view of the resilient sealing strips 6 together with their pressure communicating openings 15.

Figure 5 is a fragmental view and indicates a method of indexing lever 10 so that the detent corresponds to the ports 44 in the rotatable valve plug 7 and 43 in valve body 8.

From the foregoing, it will be seen that due to the construction shown and described, I have provided a leak proof plug valve which is simple in construction and a new and novel way of sealing between ports of the valve body and rotatable cylindrical valve plug without the use of a tapered or conical plug; or, the need of lubrication to accomplish either a tight seal or to insure freedom of movement of the valve plug.

Having thus described the invention what is claimed is:

In a valve, a valve body having inlet and outlet ports, a valve plug rotatable in said body and having a passage therethrough adapted to align with said ports, a tubular stem projecting from said plug, a tubular bushing about said stem and projecting from said body, said plug having upper and lower annular grooves and also longitudinal grooves on each side of said passage, upper and lower sealing rings in said annular grooves, sealing strips in said longitudinal grooves, a chamber in said plug about said passage, said plug having openings communicating said chamber with said annular grooves, a plunger slidable in said stem, said plunger having a central passage and a pair of lateral passages extending therefrom, said plug having an axial opening communicating said central passage with said chamber, said stem having an intake opening adapted to communicate with one of said lateral passages when said plunger is in an outer position, said bushing having an annular groove adjacent the outer end thereof, a valve plug operator extending right-angularly from said bushing and having a ring at the inner end thereof loosely engaging in said bushing groove, a plunger operating lever rockably mounted between the ends thereof on said plug operator, a stud extending outwardly from said plunger having a polygonal intermediate portion, means pivotally securing said stud to said lever, a cap fixed to the outer end of said stem having a polygonal opening through which said stud slidably engages, said bushing having a keeper notch in the outer end thereof, and a locking member carried by said lever engageable in said keeper to lock said stem with said plug in open position, inward movement of said plunger placing air in said chamber under pressure and simultaneously placing said sealing rings under pressure.

References Cited in the file of this patent

UNITED STATES PATENTS

| | | |
|---|---|---|
| 1,671,069 | De Wein | May 22, 1928 |
| 1,872,417 | Dalldorf | Aug. 16, 1932 |
| 1,909,303 | Mueller | May 16, 1933 |
| 2,336,027 | Milliken | Dec. 7, 1943 |
| 2,567,032 | Schmidt | Sept. 4, 1951 |

FOREIGN PATENTS

| | | |
|---|---|---|
| 3,238 | Great Britain | of 1888 |
| 520,188 | Germany | of 1931 |
| 724,308 | Germany | Aug. 22, 1942 |